United States Patent [19]

Dunk et al.

[11] Patent Number: 4,645,593
[45] Date of Patent: Feb. 24, 1987

[54] FLUID FILTERING DEVICE

[76] Inventors: Thomas H. Dunk, 11529 Puritan, Brighton, Mich. 48116; Nick A. Marinelli, 12854 Clyde Rd., Fenton, Mich. 48430

[21] Appl. No.: 489,368

[22] Filed: Apr. 28, 1983

[51] Int. Cl.⁴ ............................................. E04H 3/20
[52] U.S. Cl. .................................. 210/169; 210/416.2
[58] Field of Search ............................. 210/169, 416.2; 417/362, 313

[56] References Cited

U.S. PATENT DOCUMENTS

| | | |
|---|---|---|
| 2,083,005 | 6/1937 | Czarnecki . |
| 2,336,127 | 12/1943 | Rocke . |
| 2,822,925 | 2/1958 | Lambertson . |
| 2,907,277 | 10/1959 | Lessly ................................ 417/362 |
| 3,152,987 | 10/1964 | Gare . |
| 3,178,024 | 4/1965 | Jacuzzi . |
| 3,273,717 | 9/1966 | Canterbury . |
| 3,289,847 | 12/1966 | Rothemund . |
| 3,308,957 | 3/1967 | Klein . |
| 3,321,081 | 5/1967 | Willinger . |
| 3,458,441 | 7/1969 | Dockery et al. . |
| 3,511,376 | 5/1970 | Sesholtz . |
| 3,513,978 | 7/1970 | Newsteder . |
| 3,635,344 | 1/1972 | Lovitz ................................. 210/169 |
| 3,747,762 | 7/1973 | White . |
| 4,036,756 | 7/1977 | Dockery . |
| 4,220,530 | 9/1980 | Gabriele . |
| 4,285,813 | 8/1981 | Stewart et al. . |

Primary Examiner—David L. Lacey

[57] ABSTRACT

A filtering apparatus with interconnected, rotatable drive wheel apparatus and driven wheel apparatus for rotating a pump impeller (32), preferably dual drive and driven pulley wheels (36 and 40) and an interconnecting belt (41) is described. A motor (13) is mounted on the underside (12a) of a housing (12) adjacent an outside sidewall 100a of a tank (100) which rotates the drive pulley wheel (40), the belt (41) and the driven pulley wheel (36). The driven pulley wheel (36) is mounted on a shaft (33) supporting a submerged impeller (32) inside a pump body (15). The filtering apparatus with the drive and driven wheel (36 and 40) provides positive fluid flow without priming and good balance for the filtering apparatus when mounted on the tank (b 100).

14 Claims, 8 Drawing Figures 4,645,593

FLUID FILTERING DEVICE

BACKGROUND OF THE INVENTION (1) Field of the Invention

The present invention relates to an improved filtering apparatus wherein an improved drive means directly drives a pump submerged in a tank. It is particularly an object of the present invention to provide a drive means which utilizes a drive pulley wheel powered by a motor and a driven pulley wheel with a shaft connected to a submerged impeller so that proper balance and weight distribution of the filtering apparatus is achieved for mounting on a tank or aquarium.

(2) Prior Art

The prior art relating to filtering apparatus for fish tanks or aquariums shows (1) pumps and drive means which are outside of the tank; and (2) pump impellers and bodies submerged in a tank which are indirectly driven by rotating magnetic means mounted on the outside of the tank. Illustrative of various types of aquarium filters and pump units are U.S. Pat. Nos. 2,822,925 to Lambertson, 3,458,441 to Dockery et al, 3,152,987 to Gare, 3,273,717 to Canterbury, 3,321,081 to Willinger, 3,511,376 to Sesholtz, 3,513,978 to Newsteder, 3,747,762 to White, 4,036,756 to Dockery, 4,220,530 to Gabriele, 4,285,813 to Stewart et al.

U.S. Patent Nos. 2,083,005 to Czarnecki, 3,178,024 to Jacuzzi, 3,289,847 to Rothemund and 3,308,957 to Klein show various types of filter cartridges or filter media. This is well known prior art.

U.S. Pat. No. 2,336,127 to Rocke shows a dual pulley wheel belt driven impeller at the bottom of a tank which creates a sealing problem. The prior art has not recognized that a dual pulley wheel belt drive system could be used in an aquarium or tank to provide a means for directly driving an impeller without providing an opening through the tank requiring sealing means.

Objects

It is an object of the present invention to provide a filtering apparatus wherein a pump impeller (32) and body (15) is submerged in a tank and yet is directly driven by a motor (13). Further, it is an object of the present invention to provide a filtering apparatus which is inexpensive to construct and yet is reliable and provides positive pumping without the necessity of priming. These and other objects will become increasingly apparent by reference to the following description and to the drawings.

In the Drawings

General Description

Figure 1:
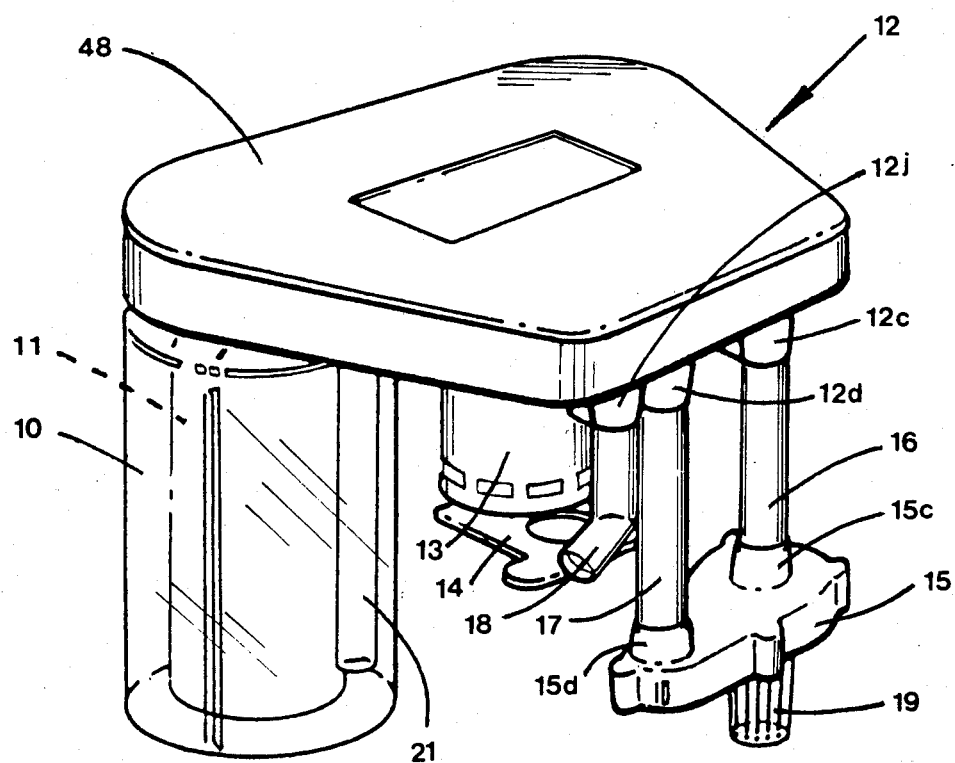
FIG. 1 is a front isometric view of one side of the filtering apparatus of the present invention, particularly showing a pump body (15) and a container (10) for the filter (11) mounted on a housing (12).

The present invention relates to a filtering apparatus, for removing foreign matter from a fluid provided in a tank (100) at a fluid level (101) and which can be mounted on a side (100a) of the tank, including filter means inside a container and pump means connected to conduit means for removing the fluid from the tank to the filtering means in the container and for recycling the filtered fluid from the container to the tank after removal of the foreign matter, the improvement in the pump means which comprises:

(a) pump impeller means (32) mounted in a pump housing defined by elements (15, 15a) defining a chamber (30) submersible in the fluid in the tank;

(b) a rotatable drive shaft (33) connected to the impeller means which has a length which can extend above the fluid level of the tank;

(c) housing (12) and support tube (16) mounted on the housing for supporting the drive shaft for rotation;

(d) rotatable interconnected drive means and driven means defined by elements (36, 40 and 41) in spaced relationship to each other and mounted on the housing with the driven means mounted on the drive shaft;

(e) a motor (13) with a rotor shaft (13a) mounted on the housing so as to rotate the drive means and thus the driven means, shaft and impeller means; and (f) a first conduit means defined by element (17, 43, 21, 53) leading from the pump housing to a container (10, 54) which is connected to a second conduit means defined by element (18, 46, 50, 52) which leads to the tank.

The present invention particularly relates to a filtering apparatus, for removing foreign matter from a fluid provided in a tank (100) at a fluid level (101) and which can be mounted on a side (100a) of the tank, including filter means inside a container and pump means connected to conduit means for removing the fluid from the tank to the filtering means in the container and for recycling the filtered fluid from the container to the tank after removal of the foreign matter, the improvement in the pump means which comprises:

(a) pump impeller means (32) mounted in a pump housing defined by elements (15, 15a) defining a chamber (30) submersible in the fluid in the tank;

(b) a rotatable drive shaft (33) connected to the impeller means which has a length which can extend above the fluid level of the tank;

(c) a driven pulley wheel (36) attached to the drive shaft;

(d) housing (12) and support tube (16) mounted on the housing for supporting the drive shaft for rotation by the driven pulley wheel;

(e) a rotatable drive pulley wheel (40) placed in spaced relationship to the driven pulley wheel and mounted on the housing;

(f) belt means (41) mounted around the drive pulley wheel and driven pulley wheel;

(g) a motor (13) with a rotor shaft (13a) mounted on the housing so as to drive the pulley wheel and thus the belt, driven pulley wheel, shaft and impeller means; and (h) a first conduit means defined by elements (17, 43, 21, 53) leading from the pump housing to a container (10, 54) which is connected to a second conduit means defined by elements (18, 46, 50, 52) which leads to the tank.

Specific Description

Figure 2:
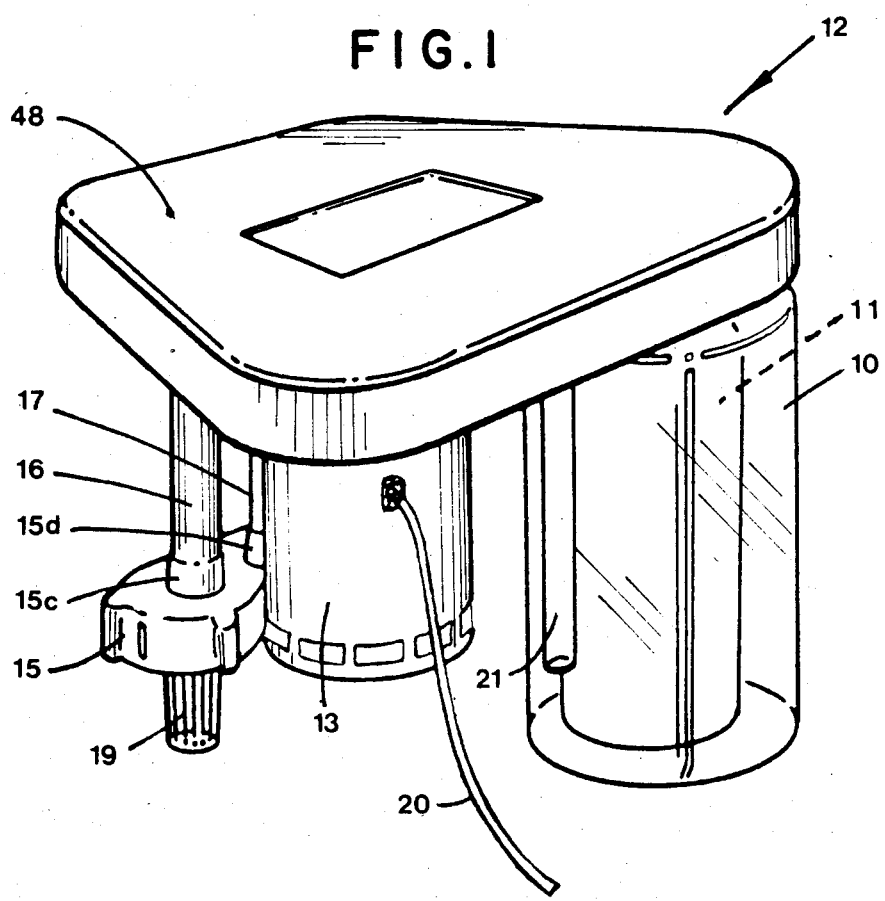
FIG. 2 is a front isometric view of the opposite side of the filtering apparatus shown in FIG. 1, particularly showing the positioning of a motor (13) relative to the filter (11) and the container (10) and the pump body (15) mounted on the housing (12).

FIGS. 1 to 7 show the preferred filtering apparatus of the present invention. As shown in FIGS. 1 and 2, the major elements of the apparatus are a container 10, which is preferably transparent glass, for a filter 11. The container 10 is supported by a housing 12. A motor 13 is mounted on the housing 12 and supports an adjuster plate 14 for positioning the apparatus. The housing 12 supports a pump body 15 by means of the drive shaft tube 16 and fluid riser tube 17. A fluid exhaust tube 18 is provided for fluid return. A conventional intake screen 19 having slotted openings is mounted on the pump body 15. An electrical cord 20 supplies current to the motor 13. A drop tube 21 depends from housing 12 and is part of the fluid supply to the inside the container 10.

Figure 3:
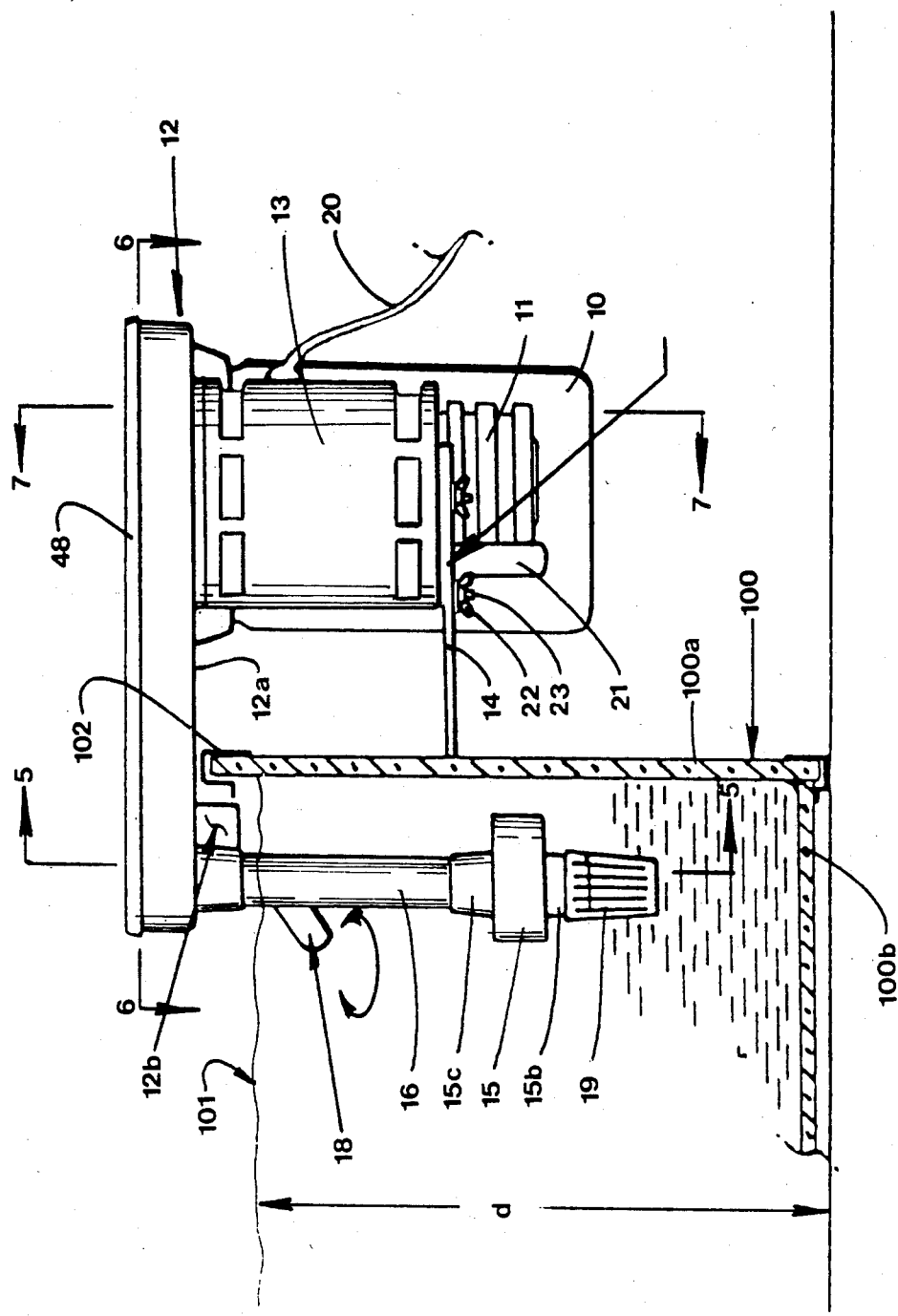
FIG. 3 is a front side view of the filtering apparatus of the present invention showing the mounting of the apparatus on a sidewall (100a) of a tank (100) so that the pump body is submerged.

FIG. 3 shows the filtering apparatus mounted on a side 100a of a tank 100, such as a fish aquarium, with the underside 12a of housing 12 resting on the sidewall 100a. The tank 100 includes the usual molding 102 upon which the underside 12a of the housing 12 rests. The tank 100 includes a bottom 100b which with fluid level 101 defines the depth d of tank 100. As can be seen from FIG. 3, the drive shaft tube 16, pump body 15 and intake screen 19 preferably have a length which is sufficient to penetrate more than about one-half (½) of the depth d of the tank 100 and the exhaust tube 18 is adjacent to and below the fluid level 101 to provide for good fluid circulation.

Figure 4:
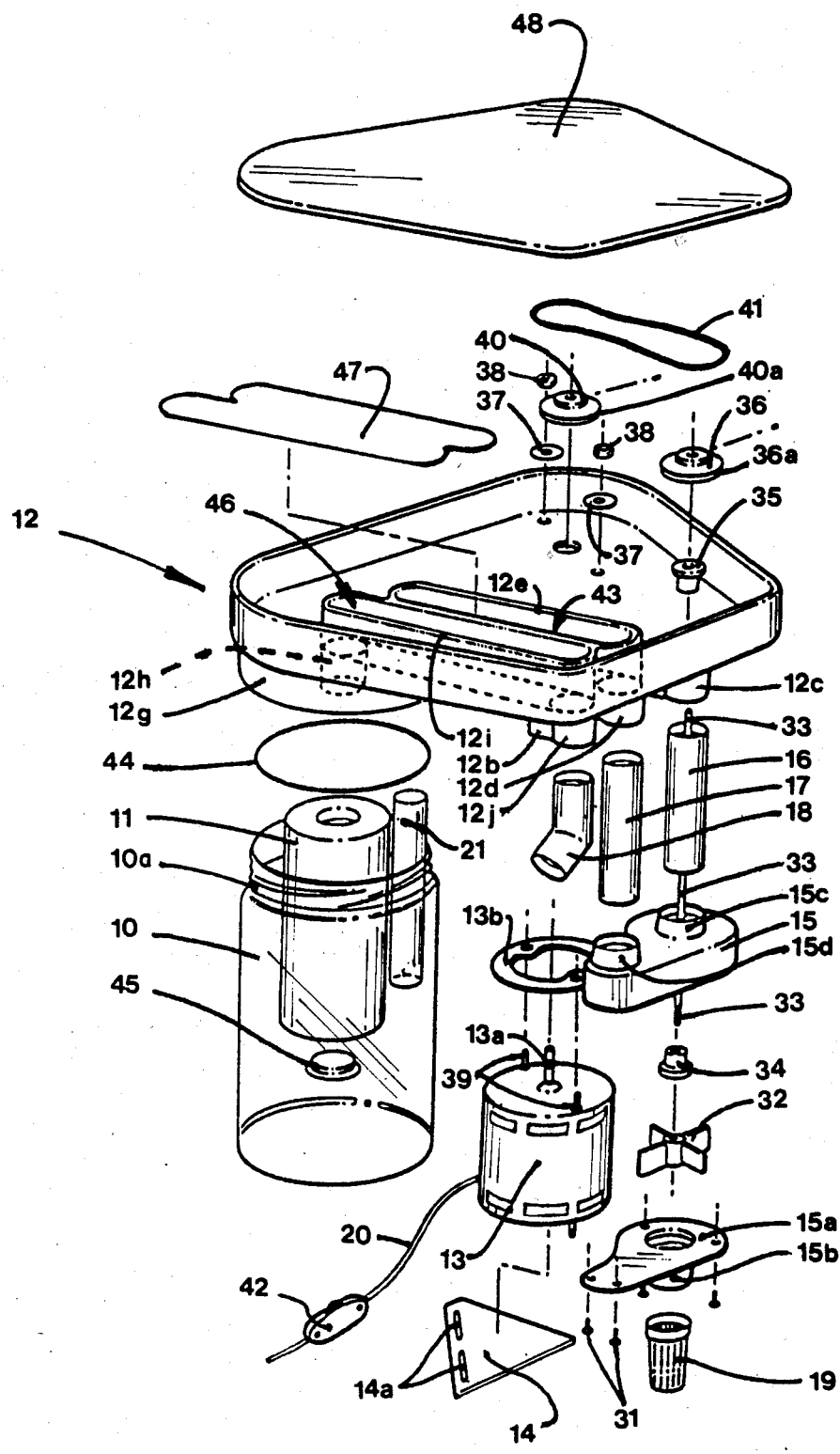
FIG. 4 is an exploded isometric front view of the filtering apparatus as shown in FIG. 2, particularly illustrating the mounting of the pump impeller (32) in the pump body (15) and the mounting of the motor (13) and the A container (10) on the housing (12).

The filtering apparatus is positioned by integral housing extension 12b which is mounted adjacent to the exhaust tube 18 on the housing 12. The adjuster plate 14 bears on the sidewall 100a of tank 100 and is adjusted by means of a nut 22 which mounts on stud 23 provided on motor 13. As shown in FIG. 4, the adjuster plate 14 is provided with slots 14a and 14b which allow horizontal adjustment of the plate 14 towards and away from the sidewall 100a of tank 100. The weight of the apparatus, particularly the motor 13 and container 10, holds the filtering apparatus on the sidewall 100a of the tank 100.

Figure 5:
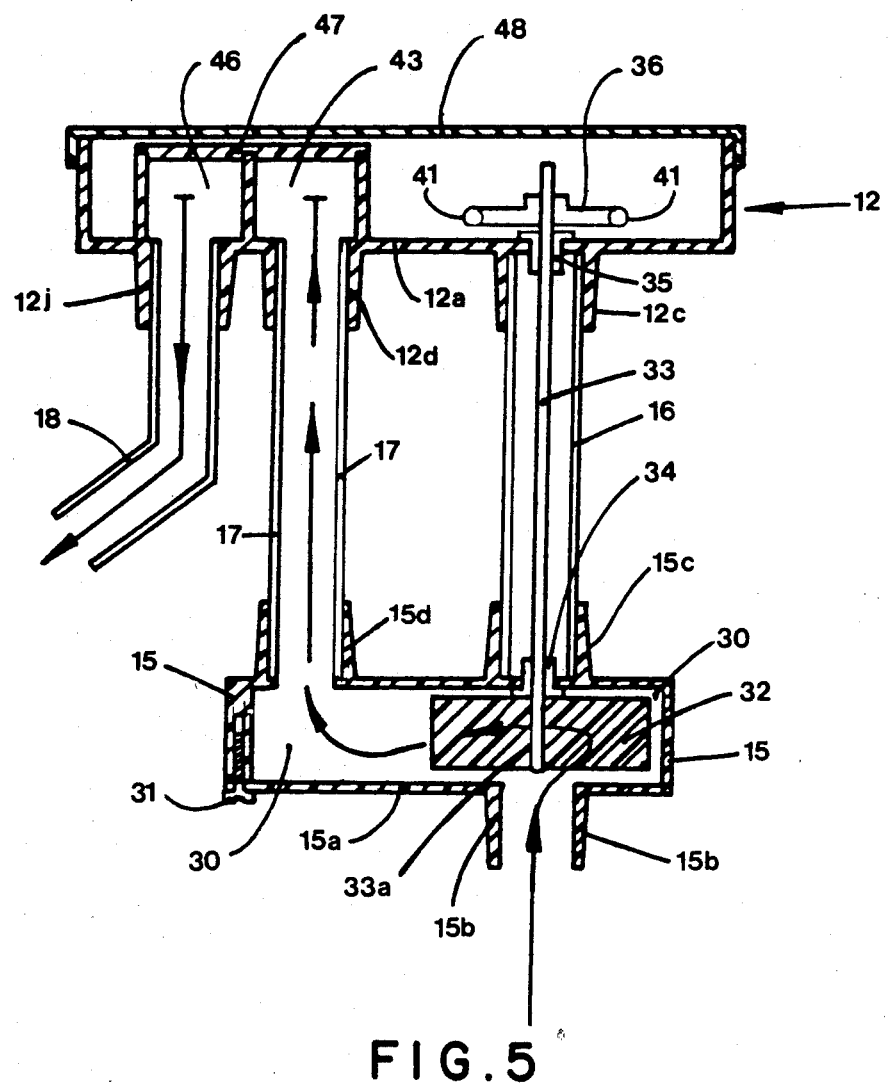
FIG. 5 is a front cross-sectional view along line 5—5 of FIG. 3 across the pump body (15), a riser tube (17), drive shaft (33) and drive shaft support tube (16) particularly showing the fluid flow to and from the housing (12).

FIGS. 4 and 5 show the details of the construction of filtering apparatus shown in FIGS. 1 to 3. The pump body 15 is provided with a lower cover 15a which encloses the body 15 to provide a chamber 30 (FIG. 6) and is mounted by screws 31 to body 15. The cover 15a is provided with an integral tubular cover extension 15b which mounts the screen 19 in a press fit. The body 15 includes an integral tubular shaft extension 15c for mounting the drive shaft tube 16. The body 15 also includes an integral tubular riser tube extension 15d for mounting the riser tube 17.

The pump body 15 and cover 15a encloses a pump impeller 32 which is in closely spaced relationship to the inner walls of the pump body 15 and cover 15a in chamber 30. The impeller 32 is supported by metal drive shaft 33 which is press fit on knurled portion 33a of shaft 33 at one end. The shaft 33 is journaled by bushings 34 and 35. Bushing 34 is mounted on pump body 15 inside extension 15a and bushing 35 is mounted inside housing 12 and on the underside 12a of housing 12. The housing 12 includes an integral tubular shaft housing extension 12c which supports shaft housing 16 with the bushing 35 inside. The opposite end of the shaft 33 from the impeller 32 supports a driven pulley wheel 36 which has a lock screw (not shown) engaging shaft 33 which holds the wheel 36 on shaft 33. This turning of the pulley wheel 36 causes the shaft 33 and impeller 32 to rotate in bushings 34 and 35.

Figure 6:
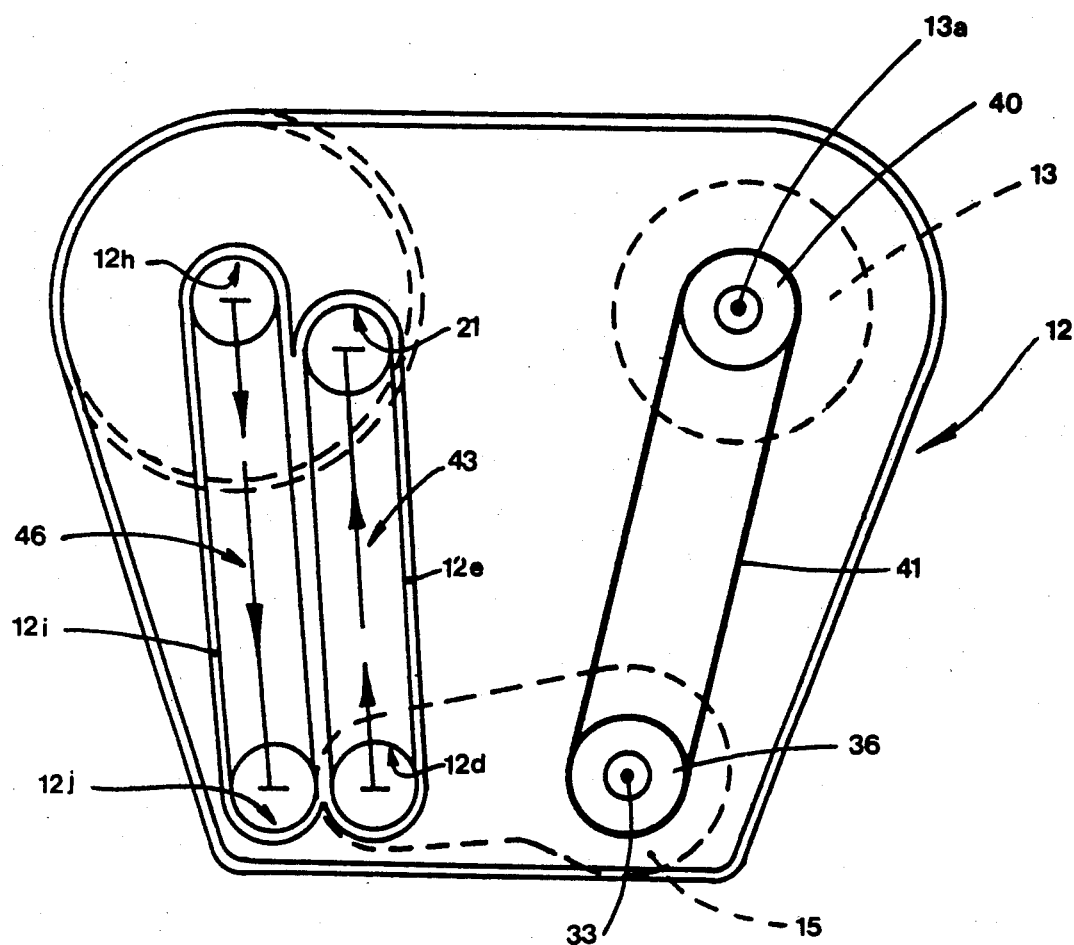
FIG. 6 is a plan cross-sectional view of the housing (12) along line 6—6 of FIG. 3, particularly showing a drive pulley wheel (40) and a driven pulley wheel (36) supporting a flexible and elastic belt (41) and showing cavities (43 and 46) defining a portion of the conduits for fluid flow to and from the container (10).
Figure 7:
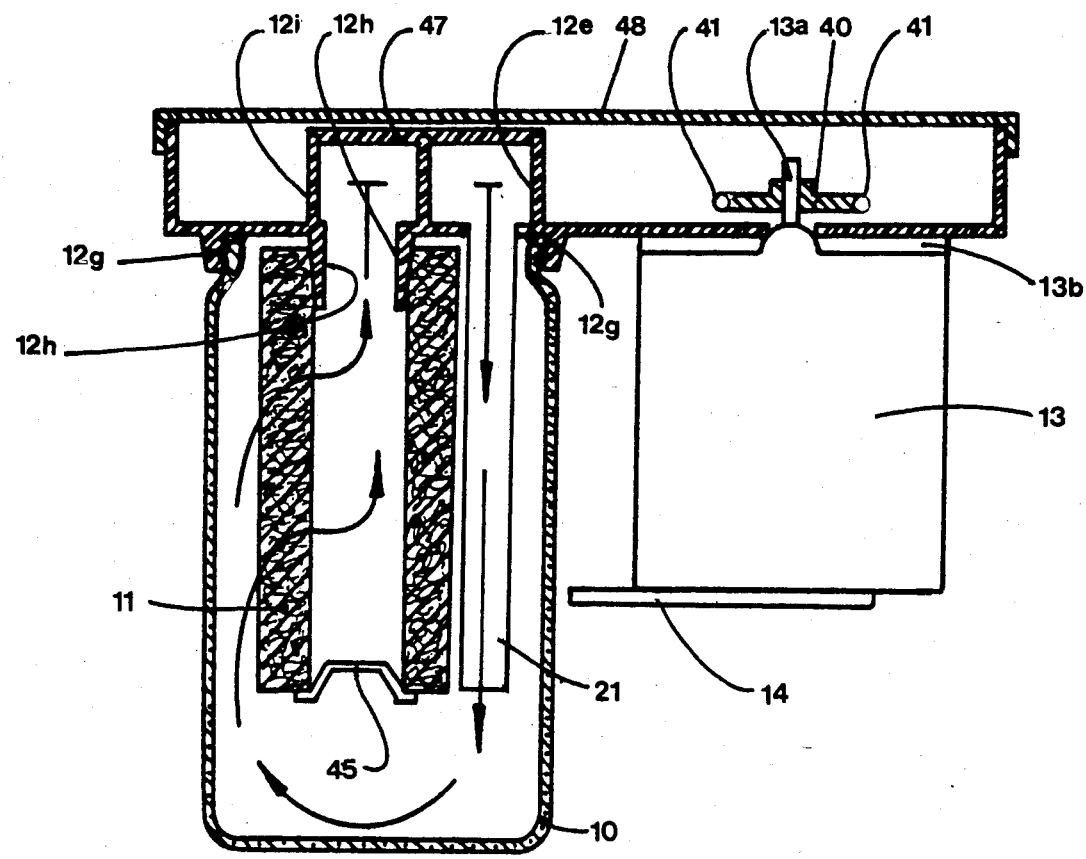
FIG. 7 is a front cross-sectional view along line 7—7 of FIG. 3 through container (10) and housing (12) showing the fluid flow through the container (10).

The motor 13 is mounted on the underside 12a of the housing 12 such that the rotor 13a projects inside the housing 12 and is secured in position by washers 37 and nuts 38 on studs 39. A gasket 13a is provided to reduce noise and vibration of the motor on the housing 12. The rotor 13a supports a drive pulley wheel 40 which is secured in position by a lock screw (not shown) engaging rotor 13a. The wheels 36 and 40 have grooves 36a and 40a on which are mounted a circular cross-sectioned belt 41 such that the belt 41 is rotated when the drive wheel 40 is powered by motor 13. Thus the grooves 36a and 40a of wheels 36 and 40 are in the same horizontal plane. In this manner, the motor 13 drives the impeller 32 when the switch 42 turns on the motor. FIG. 6 shows the belt 41 in position on the pulley wheels 36 and 40.

The chamber 30 inside pump body 15 extends away from the impeller 32 to the extension 15d supporting one end of riser tube 17. The other end of riser tube 17 is supported by an integral tubular extension 12d of housing 12 which leads to a first cavity 43 defined by integral walls 12e of housing 12 which leads to drop tube 21 which is connected to housing 12. A large integral tubular extension 12g of housing 12 is internally threaded to receive threads 10a of container 10 with a washer 44 between them to provide a fluid seal.

The filter 11 is shown as a hollow cylinder which is closed at an end remote from the housing 12 by a plug 45. The opposite end 11a of filter 11 sealably engages an integral tubular extension 12h of housing 12. The extension 12h leads to a second cavity 46 defined by integral walls 12i one side of which are common with walls 12e. The cavities 43 and 46 are closed by a cover 47 which is solvent welded or otherwise secured into position to seal cavities 43 and 46 and provide a portion of the conduits for the fluid to the container 10. The housing 12 is closed by a cover 48 which encases the wheels 36 and 40 and cavities 43 and 46 secured by screws (not shown). The cavity 46 has a tubular extension 12j for mounting exhaust tube 18 adjacent to housing extension 12b which engages sidewall 100a of tank 100.

Figure 8:
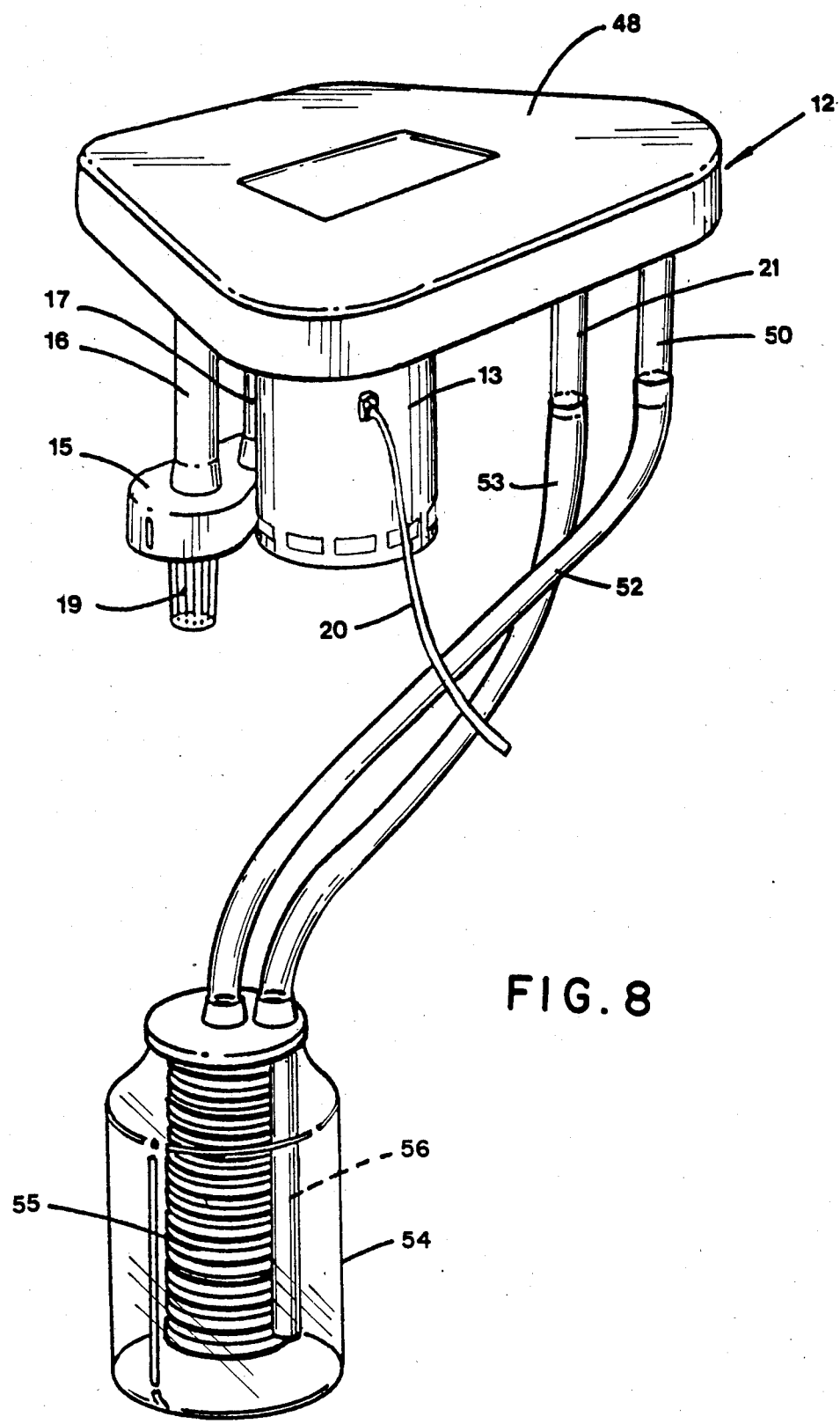
FIG. 8 is a front isometric view of a variation of the filtering apparatus of FIGS. 1 to 7 wherein the container (55) is separated from the housing (12) and connected by flexible tubes (52) and (53).

FIG. 8 shows a variation of the filtering apparatus of the present invention wherein the internal tube 12h supports tube 50 which with tube 21 mounts flexible tubing 52 and 53 leading to and from a glass container 54 with a filter 55 inside as shown in FIG. 4. A drop tube 56 is provided inside the container 54 leading from tube 53. In this manner a remotely located filter 55 in container 54 can be used which is more convenient for some applications.

In operation the motor 13 of the filtering apparatus is turned on by switch 42 which turns rotor 13a and drive pulley wheel 40 which drives belt 41 and driven pulley wheel 36 so as to turn shaft 33 and impeller 32 in pump body 15 as shown in FIG. 5. Fluid is drawn through screen 19 from tank 100 into chamber 30 and progresses up riser tube 17 through the first cavity 43 and into container 10 or 54 through drop tube 21 alone or with flexible tube 53. This fluid represents the fluid to be filtered. The fluid passes through the cartridge filter 11 or 55 and to the second cavity 46 via tubes 50 and 52 and out exhaust tube 18 into tank 100.

The filtering apparatus provides positive fluid flow and thus there is no need to prime the pump with fluid as conventional in prior art aquarium filtering apparatus. Further, because the filtering apparatus processes relatively large volumes of fluid even with a small motor 13, it can be operated intermittently rather than continuously. The belt 41 drive is very quiet. Even with a relatively small motor of between about 1/10 and ⅓ H.P., the apparatus processes between 100 and 3500 gallons per hour of fluid through the container 10 or 54.

The pulley wheels 36 and 40 can be replaced with intermeshing gears although this is not preferred since they are noisier. Also various types of belts can be used with the pulley wheels 36 and 40 such as sprockets with teeth and drive chains which are much more expensive. It will be appreciated that diatomaceous earths are preferably used as the filter material inside the filter 11. Carbon particles can also be used alone or with the diatomaceous earth. Also zeolites, such as Dowex ®, can be used in the filter 11 to remove ammonia which kills fish. All of these variations will be obvious to those skilled in the art.

We claim:

1. In a filtering apparatus, for removing foreign matter from a fluid provided in a tank (100) at a fluid level (101) and which can be mounted on a side (100a) of the tank, including filter means inside a container and pump means connected to conduit means for pumping and removing the fluid from the tank to the filtering means in the container and for recycling the filtered fluid from the container to the tank after removal of the foreign matter, wherein the pump means comprises:
   (a) pump impeller means (32) mounted in a pump housing (15, 15a) defining a chamber (30) submersible in the fluid in the tank;
   (b) a rotatable drive shaft (33) connected to the impeller means which has a length which can extend above the fluid level of the tank;
   (c) housing means (12) and support means (16) mounted on the housing means and supporting the drive shaft for rotation;
   (d) rotatable interconnected drive means, driven means (36, 40 and 41) in spaced relationship to each other and mounted on the housing means with the driven means mounted on the drive shaft;
   (e) a motor (13) mounted on the housing means so that when the apparatus is mounted on the tank it will be outside of the tank and includes a rotor shaft (13a) in spaced apart relationship to the drive shaft and connected to the drive means so as to rotate the drive means and thus the driven means, shaft and impeller means; and (g) said conduit means comprises a first conduit means (17, 43, 21, 53) separate from the drive shaft leading from the pump housing to the container (10, 54) containing the filtering means which filters the fluid pumped by the pump impeller means through the filter means and then through a second conduit means (18, 46, 50, 52) which will direct filtered fluid back to the tank.

2. In a filtering apparatus, for removing foreign matter from a fluid provided in a tank (100) at a fluid level (101) and which can be mounted on a side (100a) of the tank, including filter means inside a container and pump means connected to conduit means for pumping and removing the fluid from the tank to the filtering means in the container and for recycling the filtered fluid from the container to the tank after removal of the foreign matter, wherein the pump means comprises:
   (a) pump impeller means (32) mounted in a pump housing (15, 15a) defining a chamber (30) submersible in the fluid in the tank;
   (b) a rotatable drive shaft (33) connected to the impeller means which has a length which can extend above the fluid level of the tank;
   (c) a driven pulley wheel (36) attached to the drive shaft;
   (d) housing means (12) and support means (16) mounted on the housing means and supporting the drive shaft for rotation by the driven pulley wheel;
   (e) a rotatable drive pulley wheel (40) placed in spaced relationship to the driven pulley wheel and mounted on the housing means;
   (f) belt means (41) mounted around the drive pulley wheel and driven pulley wheel;
   (g) a motor (13) mounted on the housing means so that when the apparatus is mounted on the tank it will be outside the tank and will extend below the fluid level with a rotor shaft (13a) in spaced apart and parallel relationship to the drive shaft and connected thereto so as to rotate the drive pulley wheel and thus the belt, driven pulley wheel, shaft and impeller means; and
   (h) said conduit means comprises a first conduit means (17, 43, 21, 53) separate from the drive shaft leading from the pump housing to the container (10, 54) containing the filtering means which filters the fluid pumped by the pump impeller means through the filter means and then through a second conduit means (18, 46, 50, 52) which will direct filtered fluid back to the tank.

3. The filtering apparatus of claim 2 wherein the housing means has an underside (12a) wherein the container for the filtering means is mounted on the underside of the housing means and wherein the housing means includes wall means defining portions (43, 46) of the first and second conduit means.

4. The filtering apparatus of claim 2 wherein the housing means confines the drive pulley wheel and the driven pulley wheel.

5. The filtering apparatus of claim 2 wherein the drive pulley wheel and the driven pulley wheel have grooves (36a, 40a) which receive an elastic and flexible belt as the belt means which is stretched between the pulley wheels.

6. The filtering apparatus of claim 2 wherein the housing means has an underside and wherein an adjuster plate (14) is mounted to the motor adjacent the underside of the housing means for positioning the apparatus on the side of the tank.

7. The filtering apparatus of claim 2 wherein the housing means has an underside and wherein the motor is mounted on the underside of the housing means so that the rotor shaft has a longitudinal axis of rotation parallel to a longitudinal axis of rotation on the drive shaft and wherein the motor is in spaced relationship to the pump housing so that it will be outside of the tank.

8. The filtering apparatus of claim 2 wherein the housing means is provided with a threaded extension (12g) and the filter container has a threaded extension connected to the tPhreaded extension of said housing means wherein the first and second conduit means lead to and from the container through the housing means and wherein the housing means includes wall means defining portions (43, 46, 47) of the first and second conduit means.

9. The filtering apparatus of claim 2 wherein portions (43, 46, 47) of the first and second conduit means are defined by wall means in the housing means, and by flexible conduits (52, 53) leading to and from the portions of the housing means to the container (54) so that fluid flows through the container and filtering means and is returned to the housing means.

10. The filtering apparatus of claim 2 wherein the container for the filtering means is mounted on the housing means and wherein the housing means includes wall means defining portions (43, 46) of the first and second conduit means, wherein the housing means confines the drive pulley wheel and the driven pulley wheel, wherein the drive pulley wheel and the driven pulley wheel have grooves (36a, 40a) which receive an elastic and flexible belt as the belt means which is stretched between the pulley wheels and wherein the motor is mounted on the housing means so that the rotor shaft has a longitudinal axis of rotation parallel to a longitudinal axis of rotation of the drive shaft.

11. The filtering apparatus of claim 10 wherein the housing, means is provided with a threaded extension (12g) and the filter container includes a threaded extension connected to the threaded extension of said housing means.

12. The filtering apparatus of claim 10 wherein the first and second conduit means includes flexible conduits (52, 53) leading to and from the portions of the housing means to the container (54).

13. The filtering apparatus of claim 2 wherein the housing means has an underside and wherein the motor is mounted on the underside of the housing means so as to project inside the housing means whereby the drive pulley wheel is positioned.

14. The filtering apparatus of claim 2 wherein an adjuster plate is mounted on the motor so as to be able to position the apparatus with respect to the tank.

* * * * *